June 21, 1966  A. SAMMS  3,257,089
EMERGENCY RELEASE FOR EXTRACTION CHUTE
Filed Aug. 18, 1964  3 Sheets-Sheet 1
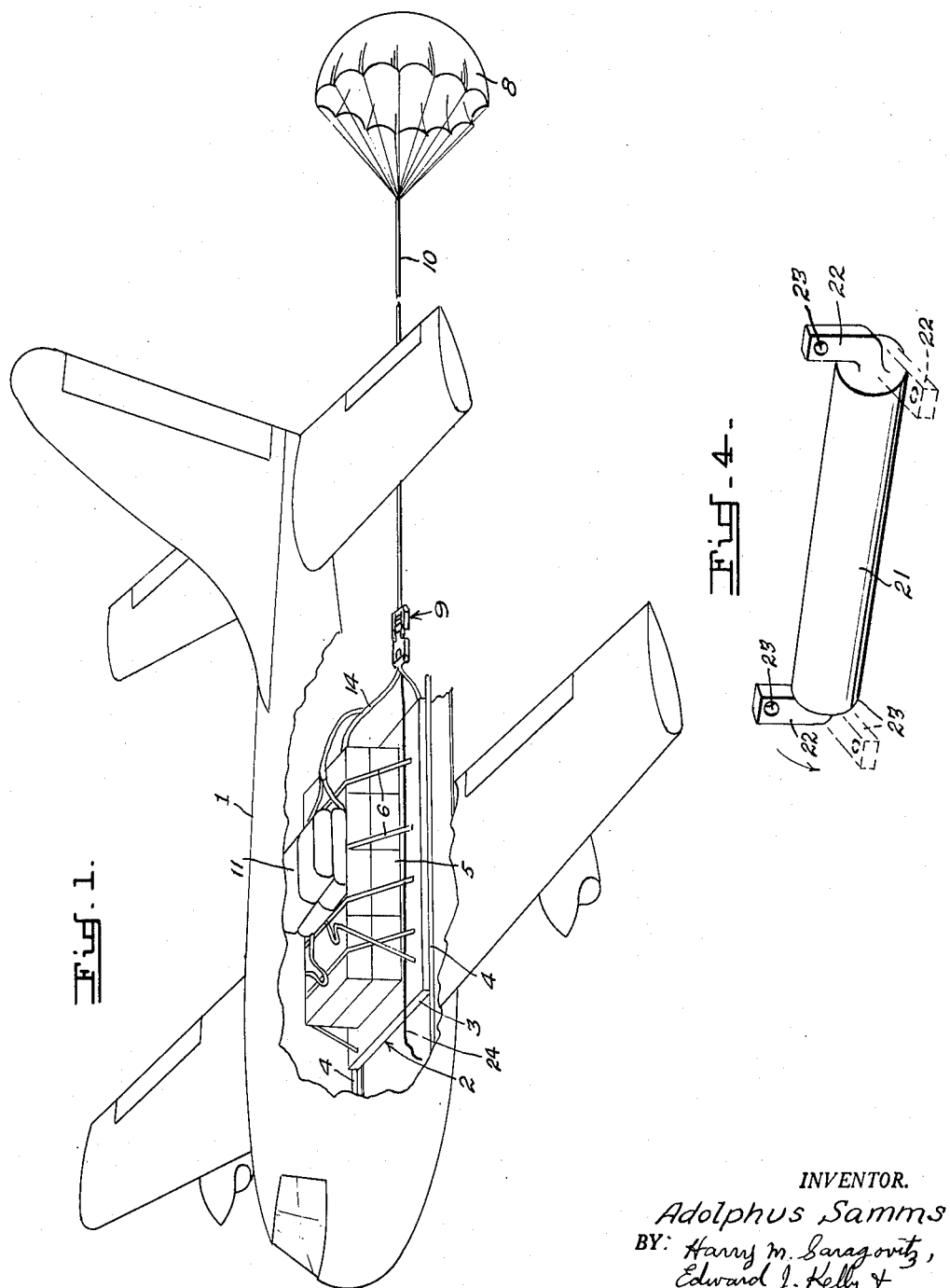
INVENTOR.
Adolphus Samms
BY: Harry M. Saragovitz,
Edward J. Kelly &
Herbert Berl June 21, 1966   A. SAMMS   3,257,089
EMERGENCY RELEASE FOR EXTRACTION CHUTE
Filed Aug. 18, 1964   3 Sheets-Sheet 2
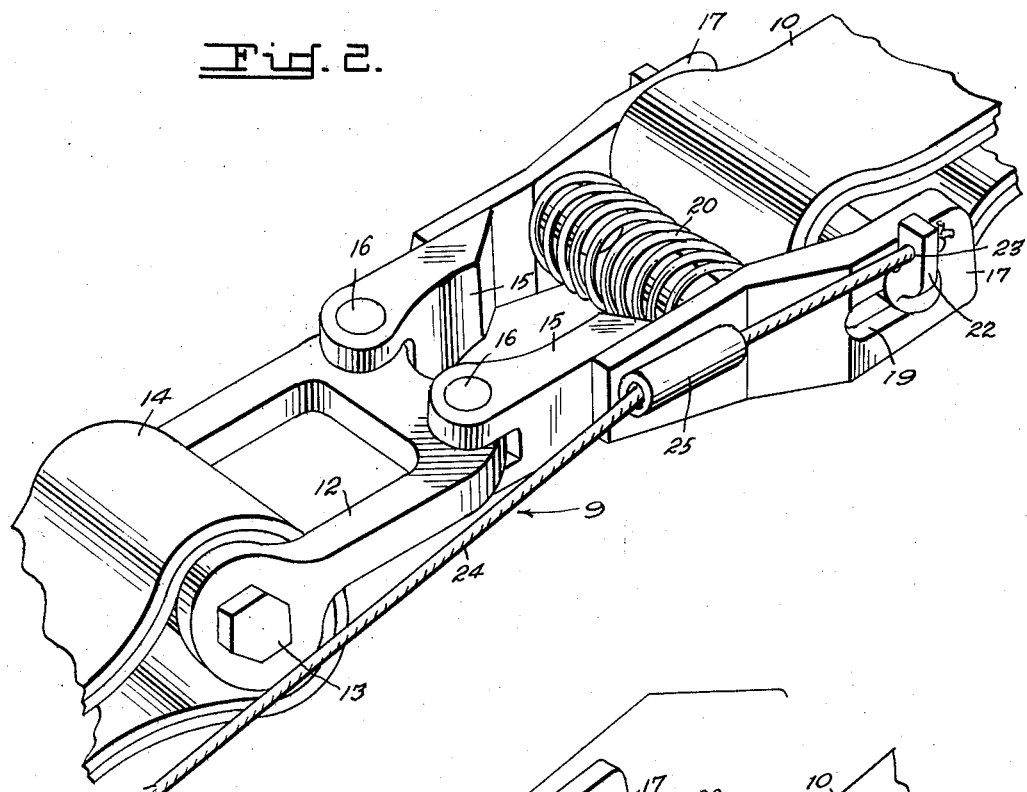
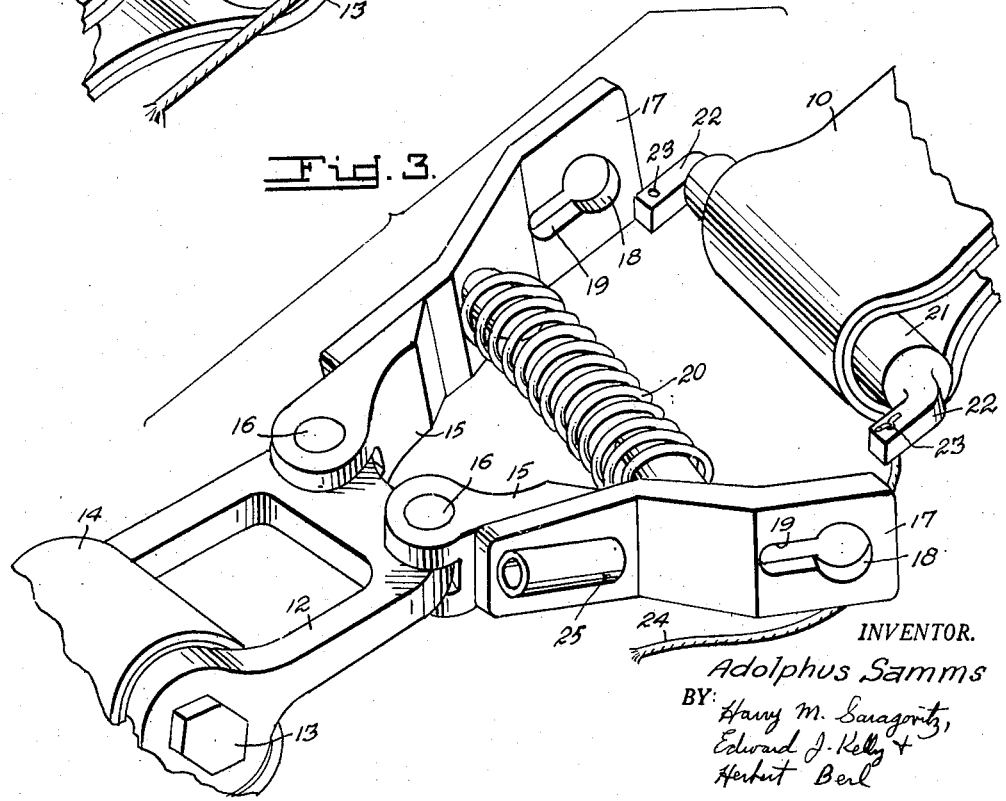
INVENTOR.
Adolphus Samms
BY: Harry M. Saragovitz,
Edward J. Kelly +
Herbert Berl June 21, 1966 A. SAMMS 3,257,089
EMERGENCY RELEASE FOR EXTRACTION CHUTE
Filed Aug. 18, 1964 3 Sheets-Sheet 3
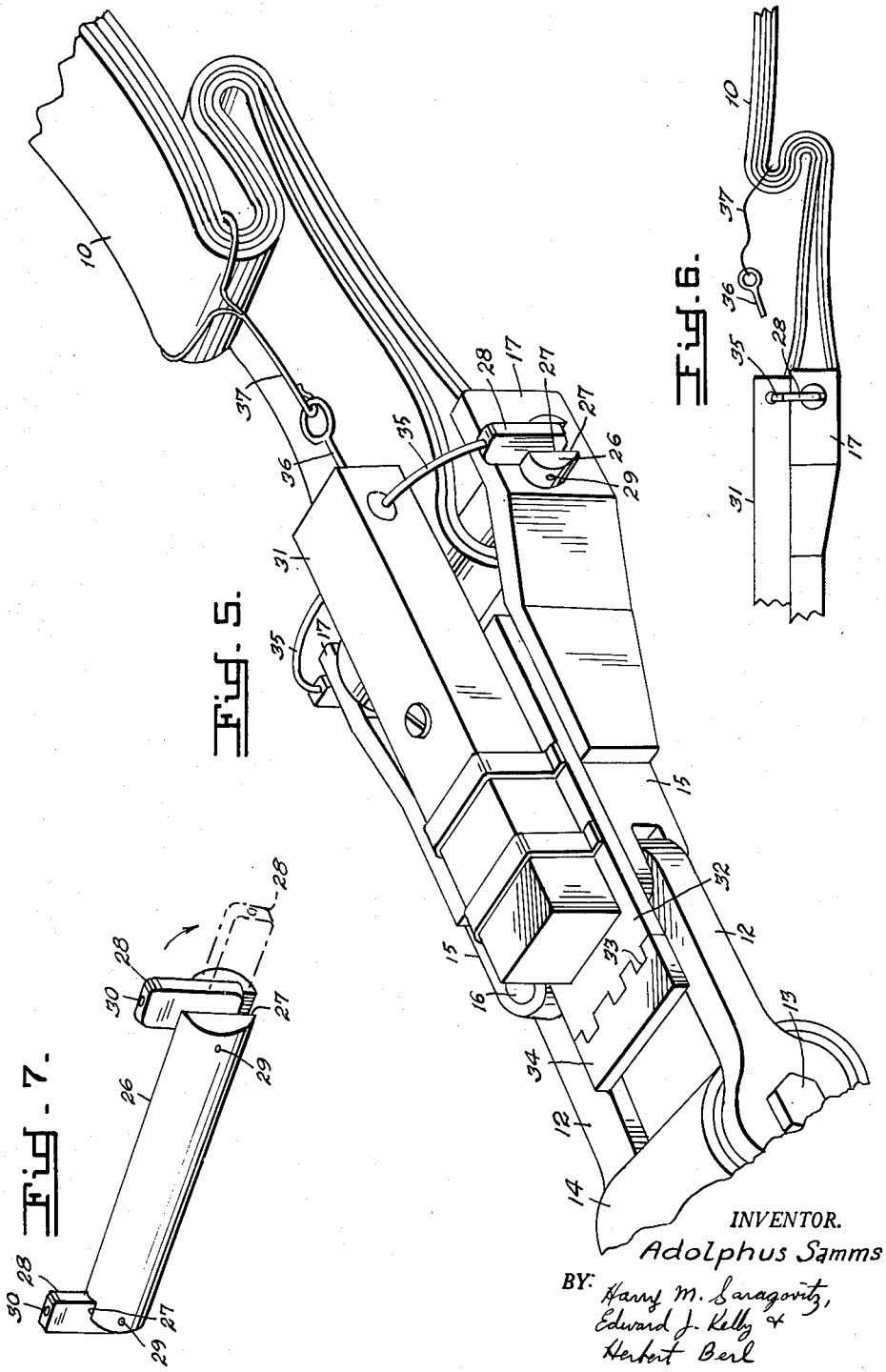
INVENTOR.
Adolphus Samms
BY: Harry M. Saragovitz,
Edward J. Kelly &
Herbert Berl

United States Patent Office 3,257,089
Patented June 21, 1966

3,257,089
EMERGENCY RELEASE FOR EXTRACTION CHUTE
Adolphus Samms, Box 3377 YPC, Yuma, Ariz.
Filed Aug. 18, 1964, Ser. No. 390,491
4 Claims. (Cl. 244—151)

The invention described herein may be manufactured and used by or for the Government for governmental purposes, without the payment to me of any royalty thereon.

This invention relates to an emergency release for extraction chute and more particularly to a device for releasing a deployed extraction parachute from a load in a cargo carrying aircraft in event that the load has been hung due to malfunction of the rail restraint system.

Loads to be parachuted from cargo carrying aircraft are usually secured to a skid which is slidably mounted on rails or the like. A small extraction chute is released which pulls the load from the aircraft whereupon a larger parachute is automatically opened during a free fall and at a predetermined time (usually 10 seconds) by a suitable opening device or by a static line.

Occasionally, after deployment of the extraction chute, the rail restraint system prevents the load from being pulled out of the aircraft due to some malfunction thereof.

In case of the aforesaid malfunction, a member of the crew must go to the rear of the load (loads being normally extracted from the rear of the aircraft) and cut the extraction line and release the extraction chute because the chute is now acting as a drag and reducing the flying speed of the aircraft and possibly causing stalling of the aircraft.

When the member of the crew is at the aforesaid position, between the load and extraction chute, it is obvious that he is in much danger. Should the hung load become suddenly freed and pulled out of the aircraft, the crew member could be pushed out of the cargo hatch by the load and fall to his death.

It is therefore the chief object of this invention to provide a means for safely releasing the extraction chute from a hung load in an aircraft.

It is another object of the invention to provide a mechanism for releasing an extraction chute from a position of safety out of the extraction path of the load.

It is a further object to provide a mechanism for releasing an extraction chute that is simple of construction and positive in action.

The foregoing and other objects of the invention will become apparent from a study of the following specification, taken in conjunction with the accompanying drawings in which:

FIG. 1 is a perspective view of a cargo carrying aircraft, its fuselage being cut away to expose a load therein and an extraction parachute attached thereto and in deployed position.

FIG. 2 is a perspective view of the release device of the invention and being in locked condition;

FIG. 3 is a view similar to FIG. 2, the device being in unlocked position.

FIG. 4 is a perspective view of the release pin;

FIG. 5 is a perspective view of the modified form of the invention;

FIG. 6 is a detail elevation view showing how the firing pin is removed by the extraction line; and, FIG. 7 is a perspective view of another form of release pin used with the device of FIG. 5.

Referring now to the drawings and in particular to FIG. 1, reference character 1 indicates a cargo carrying aircraft. A rail restraint device is indicated generally by 2 and consists of a skid 3 and rails 4. The restraint device forms no part of this invention as any expedient means for slidably mounting a load within an aircraft may be used.

A load 5 is secured to a skid 3 by straps 6. An extraction parachute 8 is attached to the release mechanism of the invention, which is indicated generally by 9, by an extraction line 10.

The load carrying parachute is indicated by 11 and is in folded or packed condition and is positioned on top of load 5.

The release mechanism of the invention is shown in FIG. 2 in its locked condition and consists of a clevis 12 having a pin 13 passing through its free ends for attachment of a shear line 14 which attaches the load parachute 11 to load 5. A pair of release arms 15 are pivoted to clevis 12 as at 16. The free ends 17 are bored as at 18 and slotted as at 19.

Release arms 15 are normally biased apart by a coil spring 20.

A release pin is indicated by 21 and has integral, outwardly turned extensions 22 which are bored as at 23. Extraction line 10 is secured on pin 21.

A safety release line 24 passes through a guide 25 and is secured in a bore 23 in one of the extensions 22.

The operation of the mechanism is extremely simple. To lock the mechanism, release arms 15 are pressed together so that the ends of pin 21 and extensions 22 are passed through bores 18 and slots 19, then the pin 21 is turned 90° to a vertical position and safety release line 24 is secured to one of the extensions 22 through bore 23. Release of pressure on the arms 15 allow them to be biased outwardly against extensions 22 and thus the mechanism is held in a locked position. (See FIG. 2.)

When it is desired to release the extraction chute 8, all that is necessary is to pull the safety release line 24 until extensions 22 are turned 90° back in line with slots 19 whereupon release arms 15 spring outwardly under bias of spring 20 to release pin 21, extraction line 10 and extraction chute 8, which of course is blown free from load 5 and aircraft 1.

Safety line 24 may be extended to any length to a safe point in the aircraft from which it is desired to operate the release mechanism therefrom.

The release mechanism of the invention may also be operated automatically if desired and such means are shown in FIG. 5.

The mechanism shown in this figure is basically the same as in FIGS. 2 and 3 with the exception that the safety release line 24 is dispensed with. Thus added safety and convenience is afforded to the aircraft's crew.

In FIG. 5, the mechanism is shown in its locked condition. A modified extraction pin is used in this form and is indicated by reference character 26. (See FIG. 7.) Pin 26 is slotted at each end as at 27 and a lug 28 is pivotally mounted in each slot 27 by a pin 29. The top of each lug 28 is bored as at 30.

A 10-second cutter 31 is mounted on a base 32 which is hinged as at 33 to a plate 34 which in turn, is fixed to clevis 12 by welding or like method.

A heavy gage wire 35 holds release pin 26 in place and runs through the 10-second cutter and is held in bores 30.

A removable firing pin 36 is placed in 10-second cutter 31. The extraction line 10 is folded back and secured to firing pin 36 by a nylon line 37.

The 10-second cutter may be a delayed action explosive mechanism which cuts wire 35 when activated by pulling out firing pin 36. However, any expedient cutting device may be used, such as one operated by a clock spring (not shown) or the like. The cutting device 31 is shown by way of example only.

In normal action, the extraction parachute 8 will, when deployed, pull out firing pin 36 whereupon an explosive charge (not shown) will cause wire 35 to be cut. Lugs 28 will fall down under their own weight and spring 20 will push release arms 15 part and release the extraction parachute 8 and its extraction line 10. Thus, the load 5 will be pulled out of the aircraft 1 during the 10-second interval, or else, if load 5 should hang due to any malfunction of the rail restraint device 2, the chute 8 will of course be released, thus making it unnecessary for a member of the crew to get between the load 5 and extraction chute 8 to release it. By the elimination of the release line 24 in this form, time lost due to, for example, hesitation on part of a crew member to pull line 24 to release chute 8 is dispersed with, and therefore makes this form positive in its action.

Firing pin 36 will not be lost since it can be tied to extraction line 10 as shown in FIG. 5.

FIG. 6 demonstrates the pull of the firing pin 36.

It is therefore apparent that a highly efficient release for an extraction parachute has been invented and one that is economical of use and extremely simple in its action.

Variations and modifications may be effected without departing from the scope of the novel concept of the present invention as set forth in the appended claims.

What is claimed is:

1. A mechanism for the emergency release of an extraction parachute from a load in an aircraft comprising, a plate connected to the load, a pair of spring biased arms pivotally mounted on said plate and a rotatable pin connected to said extraction parachute and in releasable connection to the free ends of said arms and means connected to said pin for rotating said pin into a position whereby said arms will release said pin from said mechanism to free said extraction parachute therefrom.

2. A mechanism as claimed in claim 1 wherein said means connected to said pin is operated manually.

3. A mechanism for the emergency disconnection of a deployed extraction parachute from a load in an aircraft comprising, a plate connected to the load in said aircraft, a pair of arms pivotally connected at one of their ends to said plate, a spring normally urging said arms apart, a pin connected to said extraction parachute and releasably journaled on the free ends of said arms, and means connected to said pin whereby said pin may be rotated from a locked position holding said arms together to an unlocked position whereby said arms are urged apart by said spring to release said pin and free said extraction parachute.

4. A mechanism as claimed in claim 3 wherein said means connected to said pin is operated manually.

References Cited by the Examiner
UNITED STATES PATENTS

| | | | |
|---|---|---|---|
| 2,522,790 | 9/1950 | Johnson | 294—83 |
| 2,709,054 | 5/1955 | Roth | 244—113 |
| 2,940,148 | 6/1960 | Gentile | 24—201 |
| 3,036,795 | 5/1962 | Sinclair | 244—113 |
| 3,096,055 | 7/1963 | Cotton | 244—137 |

MILTON BUCHLER, *Primary Examiner.*

ALFRED E. CORRIGAN, *Examiner.*